US010010777B1

(12) United States Patent
Schwanke

(10) Patent No.: US 10,010,777 B1
(45) Date of Patent: Jul. 3, 2018

(54) BAT SWING TRAINING SYSTEM AND METHOD OF USE

(71) Applicant: Jim Schwanke, Frisco, TX (US)

(72) Inventor: Jim Schwanke, Frisco, TX (US)

( * ) Notice: Subject to any disclaimer, the term of this patent is extended or adjusted under 35 U.S.C. 154(b) by 0 days.

(21) Appl. No.: 15/628,144

(22) Filed: Jun. 20, 2017

Related U.S. Application Data

(63) Continuation-in-part of application No. 14/797,143, filed on Jul. 12, 2015, now abandoned.

(51) Int. Cl.
| | | |
|---|---|---|
| *A63B 69/00* | (2006.01) | |
| *A63B 59/50* | (2015.01) | |
| *G01L 5/00* | (2006.01) | |
| *G01P 1/00* | (2006.01) | |

(52) U.S. Cl.
CPC .......... *A63B 69/0002* (2013.01); *A63B 59/50* (2015.10); *G01L 5/0052* (2013.01); *G01P 1/06* (2013.01); *A63B 2069/0004* (2013.01); *A63B 2069/0008* (2013.01)

(58) Field of Classification Search
CPC ............... A63B 69/0002; A63B 2069/0008
USPC ......................... 473/453, 457, 437
See application file for complete search history.

(56) References Cited

U.S. PATENT DOCUMENTS

| | | | | |
|---|---|---|---|---|
| 3,169,019 A * | 2/1965 | Genjack | ............... | A63B 59/20 124/5 |
| 3,944,225 A * | 3/1976 | Greaney | ............ | A63B 69/0002 473/256 |
| 4,759,219 A * | 7/1988 | Cobb | ............... | A63B 69/0002 473/233 |
| 4,788,863 A * | 12/1988 | Tanaka | ...................... | G01P 1/10 473/234 |
| 5,014,984 A * | 5/1991 | Brockhoff | ........... | A63B 69/0002 473/457 |
| 5,213,324 A * | 5/1993 | Bowers | ............... | A63B 69/0002 273/DIG. 30 |
| 6,093,114 A * | 7/2000 | Haringa | .............. | A63B 69/0002 473/329 |
| 8,911,309 B1 * | 12/2014 | Harihar | ............... | A63B 69/0002 473/453 |
| 9,579,557 B1 * | 2/2017 | Molinelli | ........... | A63B 69/0002 |
| 9,737,777 B2 * | 8/2017 | April | ................... | A63B 69/0002 |
| 2003/0134698 A1 * | 7/2003 | Clark | ..................... | A63B 15/00 473/457 |
| 2012/0142456 A1 * | 6/2012 | Suzuki | .................. | B65B 39/007 473/453 |

(Continued)

*Primary Examiner* — Mark Graham
(74) *Attorney, Agent, or Firm* — Richard G. Eldredge; Eldredge Law Firm

(57) ABSTRACT

A system for swing training with a bat, the system includes a training device, having a bat spacer attached to a sweet spot position on the bat about a barrel portion of the bat, the bat spacer having a body with a top surface and a bottom surface; the bottom surface is contoured to snugly fit against an outer surface of the barrel portion; the bottom surface is secured against the outer surface via an adhesion material; and the bottom surface wraps partially around the outer surface; a flexible energy absorbing cover attached to the top surface of the bat spacer, the flexible energy absorbing cover having an interior cavity; an electronic faceplate secured within the interior cavity to sense data associated with the bat coming into contact with a ball; and an electronic device in wireless communication with the electronic faceplate; the electronic device is to record data sensed.

10 Claims, 6 Drawing Sheets

(56) References Cited

U.S. PATENT DOCUMENTS

| | | | |
|---|---|---|---|
| 2013/0184106 A1* | 7/2013 | McCrory | A63B 69/0002 473/457 |
| 2014/0371008 A1* | 12/2014 | Geotsalitis | A63B 69/0002 473/457 |
| 2015/0072797 A1* | 3/2015 | Sakyo | A63B 24/0006 473/223 |
| 2015/0190699 A1* | 7/2015 | Cruz | A63B 69/0002 473/457 |
| 2015/0202511 A1* | 7/2015 | Duenas | A63B 69/0002 473/457 |

* cited by examiner

X-Section 4-1

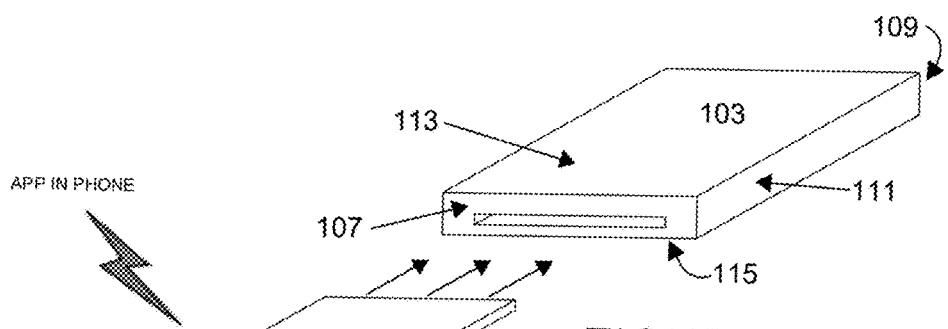
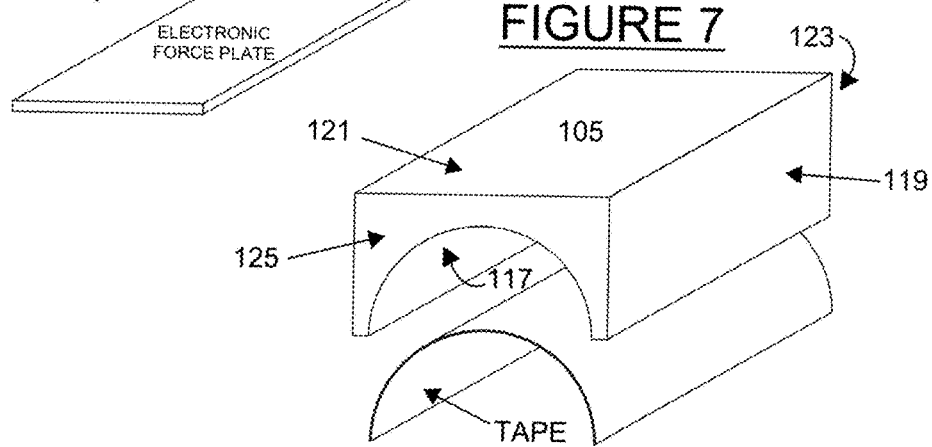

BAT SWING TRAINING SYSTEM AND METHOD OF USE

BACKGROUND

1. Field of the Invention

The present invention relates generally to batting systems, and more specifically, to a bat swing training system for recording data associated with ball and bat contact in order to improve bat swinging form.

2. Description of Related Art

Batting systems, such as is common in softball and baseball games and practice, are well known in the art and are common recreational, competitive, and professional activities. Players spend a lot of time training and practicing to obtain a skillful and precise swing, wherein the bat contacts a ball at the correct angle, speed, and location. During a proper swing, various segments of the player's body progress through sequences of acceleration and deceleration to transfer energy to the ball. This transfer of energy must be direct appropriately to hit the ball as desired by the player.

One of the problems commonly associated with conventional player practice and training devices is limited feedback to the player. For example, the player must rely on coaching, physical feel, and other secondary factors to determine what changes to make in their swinging technique. These factors do not provide precise feedback, and improvement can therefore be slow and Accordingly, although great strides have been made in the area of batting systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIG. 6 is an exploded perspective view of an energy absorbing cover and electronic force place of the training device in accordance with the present invention; and FIG. 7 is an exploded perspective view of a bat spacer of bat swing training system in accordance with the present invention.

Figure 1:
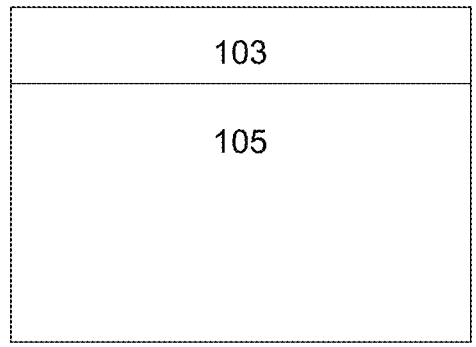
FIG. 1 is a front view of a portion of a training device in accordance with the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional batting systems. Specifically, the present invention provides a means to receive precise and accurate feedback relating to force and bat/ball contact. In addition, the present invention provides a means to monitor data associated with bat/ball contact over time. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIGS. 1-7 depict various views of elements of a bat swing training system in accordance with a preferred embodiment of the present application. It will be appreciated that the system overcomes one or more of the above-listed problems commonly associated with conventional bat systems. It must be understood that the system and method of the present invention is adaptable for use with baseball, softball, wiffleball, and similar sports.

In the contemplated embodiment, a training device 100 is configured to attach to a "sweet spot" of a bat 129. It should be understood that a sweet spot of a bat is one or more locations along a barrel of the bat, where vibration from hitting a ball is minimized, thereby directing the majority of force directly to the ball. Players attempt and train to hit balls with one of these "sweet spots."

In the preferred embodiment training device 100 includes at least an energy absorbing covering 103 and a bat spacer 105, wherein the energy absorbing covering 103 is positioned to come into contact with a ball. It should be appreciated that covering 103 can vary in materials such as foam, padding, or similar materials. Bat spacer 105 is configured to be secured between a bat 129 and covering 103. Spacer 105 can further vary material and depth as desirable for aesthetical, function, or manufacturing considerations. In the preferred embodiment, spacer 105 is the same width as the bat to which it is secured. It should be appreciated that device 100 can be adapted to fit bats of varying sizes and materials, including baseball bats, softball bats, wiffleball bats, wooden bats, plastic bats, and any other bat.

Figure 3:
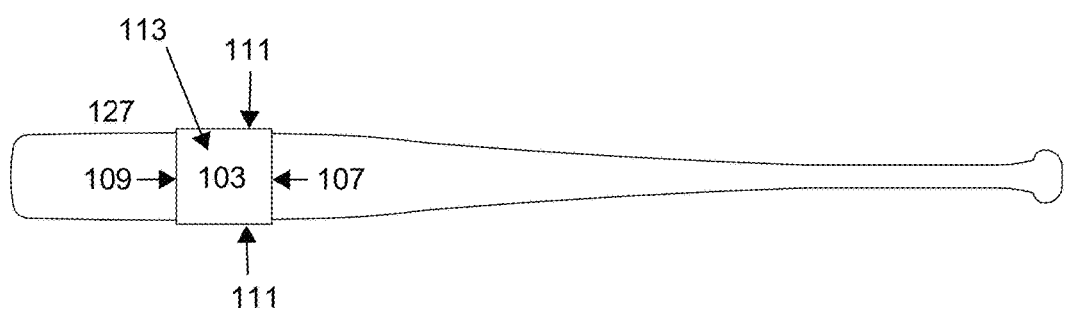
FIG. 3 is a top elevation view the training device of FIG. 1 secured to a bat.

In one embodiment, cover 103 is rectangular and includes a front surface 107 and a back surface 109, as is depicted in FIG. 3. Front surface 107 and back surface 109 can connect to a top surface 113 and a bottom surface 115, wherein top surface 113 contacts a ball during use. In the preferred embodiment, top surface 113 is substantially flat, however it is contemplated that a slight dome shape could be used in alternative embodiments.

Figure 2:
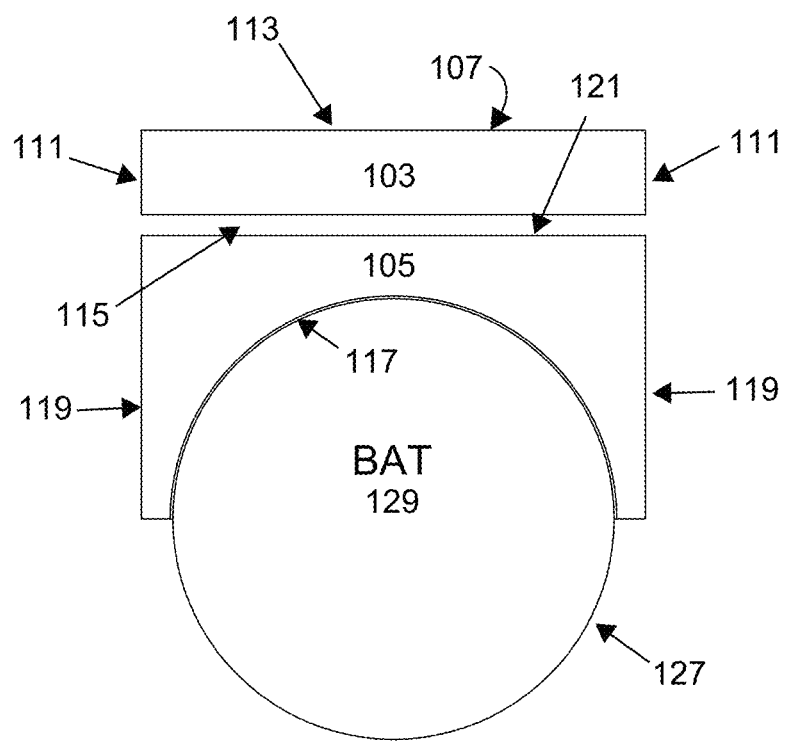
FIG. 2 is an end view of a portion of the training device of FIG. 1.

As shown in FIG. 2, spacer 105 includes a top surface 121 configured to receive bottom surface 115 of cover 103. In addition, spacer 105 includes a concave bottom surface 117 configured to snugly wrap part way around bat 127. Bottom surface 117 and top surface 121 connect to two side surfaces 119 to form the body of spacer 105. It should be appreciated that in the preferred embodiment, spacer 105 only wraps partially around bat 129 and does not completely enclose bat 129. This configuration allows for easy attachment of spacer 105 to bat 129. Spacer 105 further includes an attachment means (labeled "tape") configured to secure spacer 105 to a barrel 127 of bat 129. In the preferred embodiment, the attachment means is a double sided tape, which provides the user with quick and easy application to barrel 127. However it is contemplated that the attachment means can be a glue or other adhesive. It must be understood that spacer 105 secures to barrel 127 at a designated sweet spot.

Figure 4:
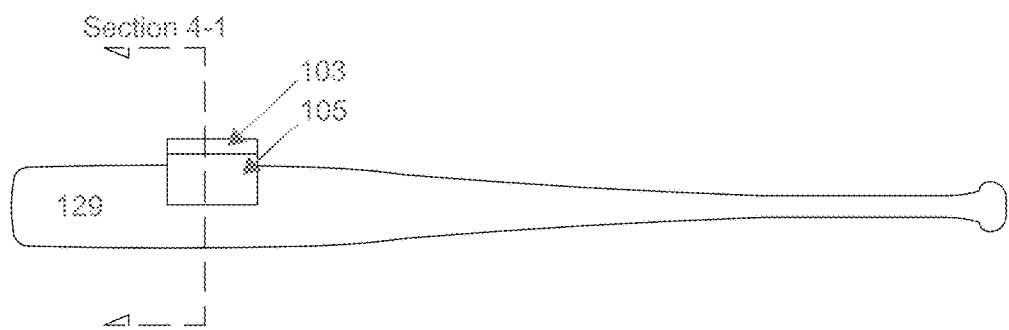
FIG. 4 is a side elevation view the training device of FIG. 1 secured to the bat.

FIGS. 3 and 4 further depict the attachment position of device 100 to bat 129. It should be appreciated that device 100 does not cover the entire barrel of bat 129. It should be appreciated that this feature reduces the weight associated with attaching a device to a bat, to better mimic the feel of a bat with no attachments.

Figure 5:
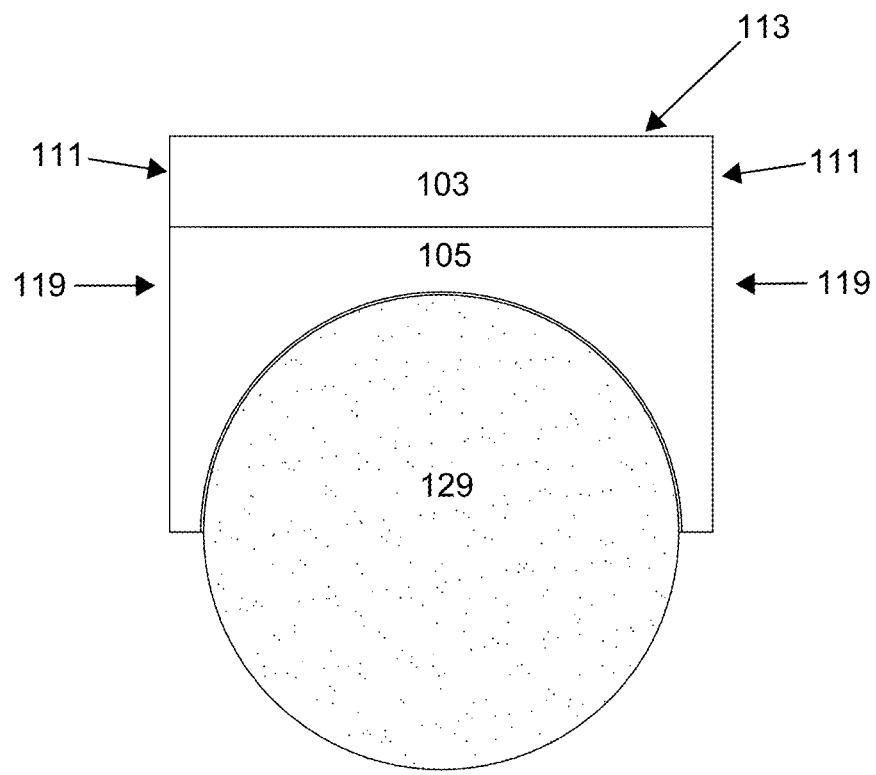
FIG. 5 is an end cross sectional view of the training device of FIG. 1 secured to a bat.

In FIG. 5, a cross sectional side view demonstrates the snug attachment of spacer 105 to bat 129 via adhesive material. In addition, cover 103 is shown flat against spacer 105, as is desirable. It is contemplated that cover 103 and spacer 105 can be integral and rigidly secured. However, alternatively embodiments contemplated cover 103 being removable and replaceable. It should further be appreciated that concave surface 117 can vary in dimensions as necessary to fit bats of various sizes.

In FIGS. 6 and 7, perspective exploded views demonstrate an entire bat training system in accordance with the present invention. In this embodiment, a training device includes spacer 105 and cover 103, wherein cover 103 further includes an interior cavity configured to receive an electronic faceplate, as shown in FIG. 6. It should be appreciated that the training device can be used with or without the electronic faceplate, as desired by the user. The electronic faceplate is configured to wirelessly communicate with an electronic device, such as a phone, computer, or tablet, wherein data is transmitted to the electronic device for recording. In one embodiment, a mobile application is configured to receive and record the data, wherein the data can be visually depicted to a user via graphs, diagrams, and/or charts. It should be appreciated that the data associated with bat/ball contact can be recorded over a period of time, thereby providing extensive monitoring for the user.

In this embodiment, the electronic faceplate includes one or more sensors configured to record data such as force applied to the ball, a precise point of contact between the bat and the ball, angle of contact between the bat and the ball, launch angle associated with the ball, speed of launch, and speed of swing of the bat. It must be understood that all of the above data is transmitted to a computing device, wherein a processor is configured to create visual representations of the data.

As shown in FIG. 6, it is contemplated that electronic faceplate can be removable from cover 103, however other embodiments contemplated electronic faceplate being permanently incorporated into cover 103.

It should be appreciated that one of the unique features believed characteristic of the present application is the incorporation of an electronic faceplate into a training device, wherein the electronic faceplate is configured to wirelessly communicate with an electronic device. It should be understood that wireless communication can be achieved via cellular, Bluetooth, wifi, or any other appropriate means.

Another object of the present invention is a method of use of the bat system. During use, the player secures the training device to a sweet spot of a bat, wherein the spacer is secured to the barrel of the bat via an adhesion material. The player then proceeds with swinging at and hitting a plurality of balls, wherein each contact between a ball and the cover of the device, provides data as determined by the electronic sensor. The data is then recorded via the electronic device and processed to create one or more visual representations of the data. The player can then use the associated data to determine desirable changes to their swinging techniques, and incorporate said changes over time to improve their batting skills.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A system for swing training with a bat, the system comprising:
    a training device, having:
        a bat spacer attached to a sweet spot position on the bat about a barrel portion of the bat, the bat spacer having:
            a body with a top surface and a bottom surface;
            wherein the bottom surface is contoured to snugly fit against an outer surface of the barrel portion;
            wherein the bottom surface is secured against the outer surface via an adhesion material; and
            wherein the bottom surface wraps partially around the outer surface;

a flexible energy absorbing cover attached to the top surface of the bat spacer, the flexible energy absorbing cover having:
   a body that forms an interior cavity;
   an opening through an exterior of the cover in communication with the interior cavity of the cover body;
   an electronic faceplate configured to slide through the opening and configured to fit within the interior cavity, the electronic faceplate is configured to sense data including force impact thereto and to communicate the sensed force impact to a remote electronic device;
wherein the flexible energy absorbing cover is configured to releasably engage with the ball.

2. The system of claim 1, wherein the data includes at least one of bat speed, exit speed of the ball, force of the ball, force location of the ball, and launch angle of flight of the ball after contact with the flexible energy absorbing cover.

3. The system of claim 1, wherein the electronic device comprises a display configured to graphically display the data.

4. The system of claim 3, wherein the electronic faceplate is configured to record a precise location a contact point between the ball and the sweet spot of the bat and transmit the precise location to be visually depicted on the display.

5. The system of claim 1, wherein the electronic device is configured to record the data over a period of time to graphically display the data associated with a plurality of swings on a chart.

6. The system of claim 1, wherein the electronic faceplate is removable from the interior cavity.

7. The system of claim 1, wherein the adhesion material is a double sided tape.

8. A method of training with a bat, the method comprising:
providing the system of claim 1;
securing the training device to the bat at the sweet spot of the bat, wherein the training device is secured via the adhesive material between the bottom surface of the spacer and the outer surface of the bat;
hitting a plurality of balls with the bat and training device, wherein the plurality of balls come into contact with the flexible energy absorbing cover;
recording data associated with hitting the plurality of balls with the electronic device; and
creating a graphical display via a computing device, wherein the graphical display is associated with the data.

9. The method of claim 8, further comprising:
determining needed adjustments of form and batting style based on the graphical display.

10. The method of claim 9, further comprising:
adjusting bat swings according the determined adjustments.

* * * * *